2 Sheets—Sheet 1.

H. E. TOWLE & J. B. BENTON,

H. E. TOWLE, Assignee.

DUPLEX REGISTERING MECHANISM.

No. 7,290. Reissued Sept. 5, 1876.

Witnesses:

W. M. Allaire.

Wm. B. Hicks

Inventors:

Hamilton E. Towle

" "

John B. Benton

THE NORRIS PETERS CO., PHOTO-LITHO., WASHINGTON, D. C.

2 Sheets—Sheet 2.
H. E. TOWLE & J. B. BENTON,
H. E. TOWLE, Assignee.
DUPLEX REGISTERING MECHANISM.
No. 7,290. Reissued Sept. 5, 1876.
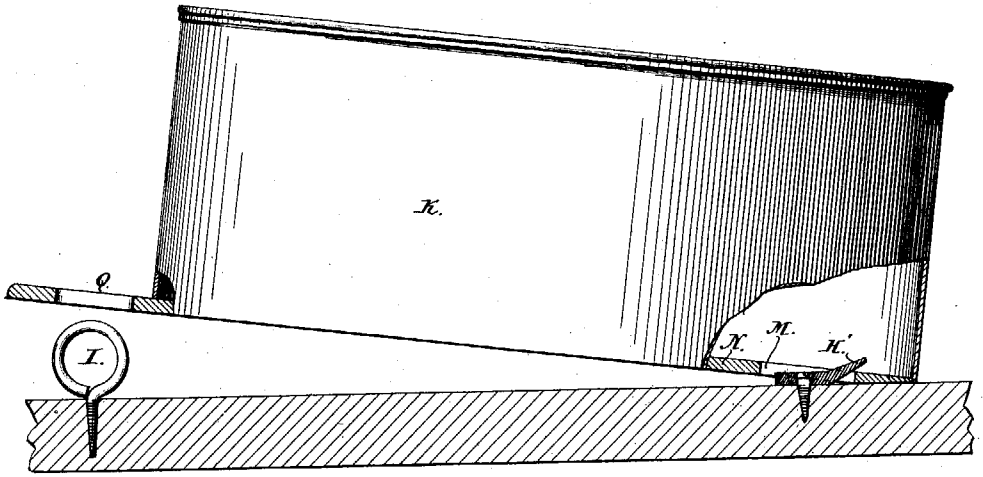
Witnesses:
Geo. H. Graham.
John A. Ellis.
Inventor:
Hamilton E. Towle
John B. Benton
by Hamilton E. Towle Attorney.
THE NORRIS PETERS CO., PHOTO-LITHO., WASHINGTON, D. C.

UNITED STATES PATENT OFFICE.

HAMILTON E. TOWLE AND JOHN B. BENTON, OF NEW YORK, N. Y.; SAID BENTON ASSIGNOR TO SAID TOWLE.

IMPROVEMENT IN DUPLEX REGISTERING MECHANISMS.

Specification forming part of Letters Patent No. 162,717, dated April 27, 1875; reissue No. 7,290, dated September 5, 1876; application filed August 23, 1876.

*To all whom it may concern:*

Be it known that we, HAMILTON E. TOWLE and JOHN B. BENTON, both civil engineers, of New York city, New York, have jointly invented certain new and useful improvements in machinery for indicating or recording the number of passengers entering cars, and for other purposes of like nature, and of which the following is a full description, having reference to the accompanying drawings, in which—

Figure 1:
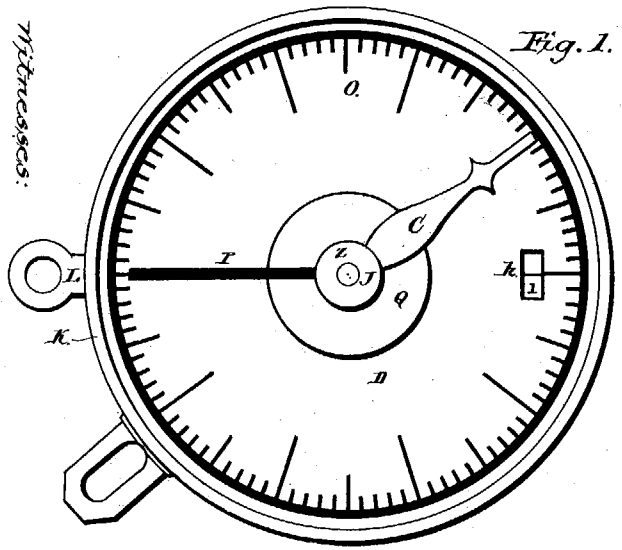
Figure 4:
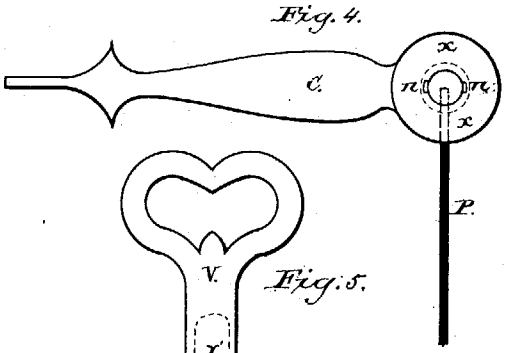
Figure 5:
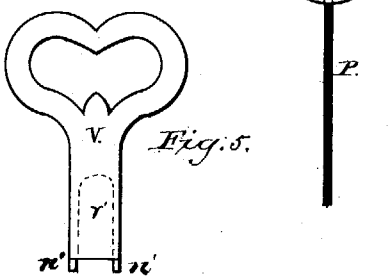

Figure 1 is front view of the machine, showing the dial D and the two index-fingers C and P, which belong to two different registers, for the purposes hereinafter described.

C is what we term the "trip-index," and P is the "permanent index," which, in conjunction with other parts, hereinafter described, show totals.

The trip-index belongs to one of the registers, and the object of this secondary register is to keep the count of fares or passengers of any partial trip or trips, mainly for the information of the conductor, to enable him to hand in the proper amount collected by him on such trip or trips, as may be desired. It also makes apparent to any observer the working of the machine during any part of the time he may be where it is, so that the performance of the prescribed duties of the conductor, in working the instrument, may be seen by any one interested in keeping a faithful record of the number of fares collected.

The permanent index belongs to the other (the primary) register, and acts in an entirely distinct manner, and for another and more permanent purpose. This other register may be described as a continuously-counting register, which cannot, except by extraordinary means, and preferably not at all, be set back or forward to reduce its indication, which is the sum or total of all the passengers indicated on all previous trips and partial trips which, at the time of registration, were indicated on the first-mentioned trip-index or trip-register, simultaneously with a corresponding increase of indication on the continuous or permanent register. The continuous or permanent register may run to any conveniently-high number, sufficiently large to practically prevent a conductor "ringing around" the register to a lower indication than the true one by passing the maximum possible indication of the primary register. They may run as high as 10,000 or 25,000, more or less, and when the highest number has been attained the register may repeat itself without adjustment.

The permanent-register mechanism is made inaccessible to any subordinate officer or servant, to prevent him from tampering with the register, while such subordinate may, without fear of any collusion with the conductor, be allowed to set back or set forward to zero (0) the trip-index or secondary register. This trip-register may have any convenient capacity. For ordinary city street-cars one hundred seems to be ample, especially if a repetition of its maximum indication is allowed. This number is selected for the extent of the graduations on the principal dial D, which, for convenience, has been made common in the machine shown in Fig. 1, to the application of two index-fingers—one, marked P, belonging to the permanent register, and the other, marked C, belonging to the trip-register—that is to say, the dial D serves for indicating units and tens in both the primary and secondary registers in preference to encumbering the machine with separate dials for this purpose.

The actuating-lever L must be pulled upon or moved every time an indication is to be made. This lever L projects through the case K a short portion of its length, and to it a convenient strap, handle, or other convenient attachment is made to enable the operator to work the machine. The dial is divided into one hundred equal spaces, conveniently numbered, and perforations are made in one or more places to allow an inspector to view numbers indicated on such parts of the continuous register as are inside the case behind the dial D. The inclosed register-wheel H, Fig. 2, indicates the number of the successive times that the index-finger P passes the century-point. D, P, and H comprise the permanent register or continuous counting-machine. This machine will, at all times, show two distinct things, namely: First, the total number of pulls the actuating-lever has received since the machine was first started, with both registers at zero; and, second, the number of times it has been actuated since the trip-register was placed at zero.

Beside the indications above described, this machine is made to attract attention by striking a blow upon a bell, to give notice that a change in its indications has been, or is about to be, made.

To accomplish this result the trip-index C is supported by a central shaft, M, and (preferably by friction) carried upon and with said shaft M, which is made to revolve through a one hundredth of its revolution, from and by each actuation of the lever L till the trip is finished.

Figure 6:
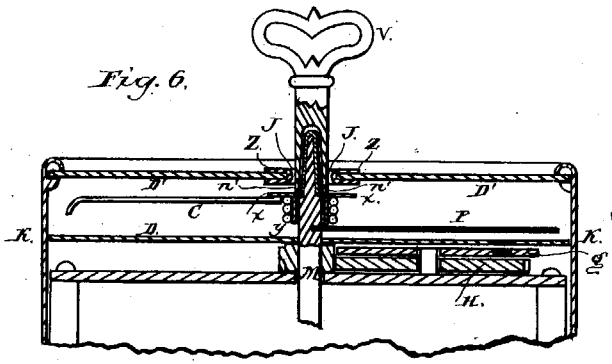

The trip-register or trip-index C may, by the conductor or an inspector, provided with a key, V, be set back or forward to the zero-point shown at O, on the dial D, Figs. 1 and 6, while at the same time the other permanent register and index-finger P continually goes on and indicates in hundreds, thousands, &c., the total number of pulls. The permanent register or indicator mechanism is inaccessible to an unauthorized person. It is positive in its motion, and cannot be altered without removing the machine from its place, or exercising violence.

The permanent index P is fixed upon or to the main shaft M, which also carries the toothed wheel W, having a sufficient number of notches to make, in conjunction with its actuating-pawl A, one hundred stops or steps corresponding to the marks on the circumference of the dial D. The pawl A is hinged to the end of lever $L^2$, and is held to its work by the spring $s^2$. $L^2$ is centered at $C^2$, and receives its motion from $L^1$, which is centered at $c$. Stops are placed at $O^1$ $O^2$ to limit the motion of the parts, and to prevent a sudden and excessive pull from causing the wheel W to move over more than one space, and thereby producing incorrect indications. A stop, B, is so placed that at the end of the movement due to one pull it causes the end of the pawl to jam itself in against the wheel W, and thus limit and stop the motion of the indicating fingers or registers, and on relaxing the strain on the main lever it and the attached parts are instantly drawn back in proper position to start again, by the action of a spring, $s^1$.

To indicate the number of revolutions of the wheel W, and the attached permanent index P, a single pin or tooth is made to act upon a disk, H. H is centered upon the pin E in the cross-bar N. To avoid confusion and error in observing the numbers upon disk H, through the oblong hole $h$ in the dial D, during the engagement of the tooth, and while disk H is in motion, a cover or guard-plate, $g$, is also centered upon pin E, and so formed, at the end next to tooth $t$, that when that tooth actuates the disk H it also carries with it the guard-plate $g$ till the tooth escapes and allows the guard-plate suddenly to cover the last exposed figure of the dial, and at the same time to expose the one next in order. The guard-plate $g$ is perforated or slotted at the end over the numbers on the disks H, to provide for this exposure, and it is actuated by a weight acting by gravity or by a spring, $s^3$. The guard-plate is limited in its motion by the stud $f$, which acts as a stop to the motion induced by the spring $s^3$. The trip index-finger C is carried by friction upon the central spindle M, and has a cap or hood attached to it, which protects the end of the shaft M from interference through the inspector's key-hole in the center of the glass plate over the dial, as shown in Fig. 6. The inspector's key fits over this cap or hood with such accuracy as to prevent strain from coming from the key upon the edges of the hole in the glass plate while setting the trip-index C to the zero-point.

The dial, with all the working parts of the machine, is inclosed in the case K, having a glass face.

P is the permanent hand. C is the loose frictional hand, which revolves with the shaft M, and which may be moved either backward or forward, and independently thereof, by the key V.

The frictional arrangement is as follows: The hand C is connected to a small disk, $x$ $x$. This disk is connected to a sleeve, $y$, which fits to the shaft M. J J represent the sides of an aperture, provided with flanges $z$ $z$, of metal, which fit to both sides of the glass cover D′ D′.

The flanges $z$ $z$ are connected together by a short sleeve or tube, passing through the glass covering the dial. The glass is secured by a series of lugs or a flange, which holds it up against the upper edge of the case K K, which is bent or spun over for the purpose of holding the glass cover to its place. V is a key inserted into the annular space for the same over the capped disk $x$ $x$. $n'$ $n'$ are two small projections on the end of the key V, which fit into corresponding recesses in the disk $x$ $x$, whereby the hand C is turned upon the shaft M.

Fig. 7 represents the top plan of the disk $x$ $x$. $n$ $n$ are two small recesses or openings in the disk $x$ $x$ to receive the end of the key.

Fig. 8 represents a broken section of the key. $v'$ represents a hole or tube forming the barrel in the end of the key to fit over the end of the shaft M. $n'$ $n'$ represent two projections or lugs, which fit in the corresponding recesses $n$ $n$ in the disk $x$ $x$. The dial and sash are intended to be constructed with or permanently secured to the case containing the mechanism, and the case itself to be secured upon a support inaccessible without the proper key, so that neither the inspector nor the conductor can, by use of the inspector's key, or of pliers, effect the indication of totals on the permanent register. A bell, Q, is secured inside the case, and is struck by hammer $r$, connected by rod $r'$ to the pawl or cam-lever $L^4$ moving upon the stud $u$. Cam-lever $L^4$ is actuated by the teeth of wheel W and the spring $s^4$, and gives one blow upon the bell at each actuation of the lever L.

The machine, therefore, contains a primary register for totals, and a secondary register or trip-indicator, thus forming a duplex registering-machine, with provisions for registering in the double manner above described the fares taken by the operator on any trip or part of a trip, with such trip or partial trip indications distinctly made separately and apart from another indication of a total, which may comprise the fares of several trips.

Figure 2:
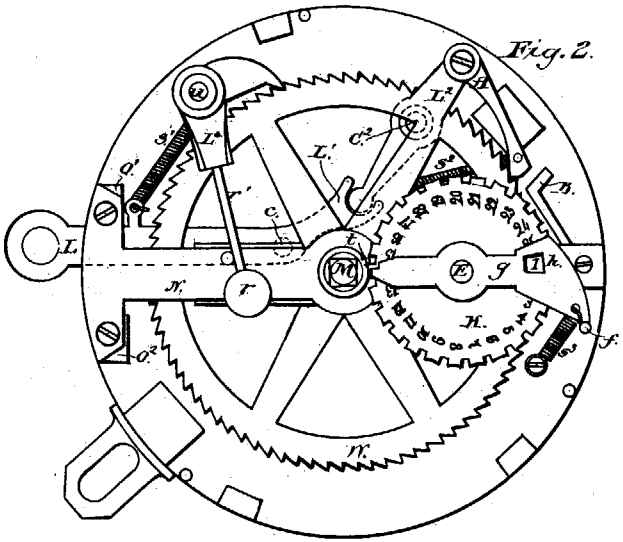

Another very important feature of our invention is to produce a machine which can be secured firmly in any desired position in cars or other places without delay, and which, in event of accident, can be removed and replaced by another instrument in a very few seconds without any interruption of the business. This object is accomplished by constructing the rear or back of the instrument with an opening, M, to admit into it a horn or hook so made that the action of the weight of the machine will tend to jam and hold the instrument against the side of the car or against any wall to which said horn or hook may be attached. This arrangement is shown in Figs. 2 and 3 of the drawings, in which N is the back of the machine, having the opening M, into which the horn or hook H′ enters, and from its inclined or sloping shape causes the edge of the opening to jam behind the horn, and thus secure the machine and prevent rattling. For a further security a staple, I, passing through a slot, Q, in a projecting ear, receives a wedge or lock, which must be removed before the machine can be taken from its place. This device will permit the rapid changing of one machine for another without the usual delays attending calling a carpenter to make the change, as is done where machines are screwed directly to the wall, and valuable time of cars and the attendants is not lost from the necessity to take a car off its line upon any accidental injury to the machine, which can be almost instantly replaced by another. Fig. 3 is an elevation of the case K, partly broken away to show the horn or hook H′, and staple I, as also the opening M for the horn in the back or base of the machine.

What we claim, and desire to secure by Letters Patent, is—

1. In registering-machines, actuated by pulls given upon a lever, the combination of two index-finger, one of which is carried by friction, and may be freely adjusted to any point on the dial, and the other of which is permanently fixed to and moves only with the driving mechanism, arranged to operate substantially as described.

2. The actuating-lever L and lever $L^2$, pawl A, and ratchet-wheel W, in combination with the stop-lock B, adapted to receive the end thrust of the pawl at each movement of the actuating-lever, whereby the ratchet-wheel is securely locked.

3. A cover-plate, provided with suitable aperture, mounted upon the same shaft and combined with a register-disk, in combination with a register-wheel, the actuating-lug of which moves simultaneously the cover-plate and the disk, to keep the proper number upon its dial in view, and to keep, at the same time, the next consecutive number on the dial obscured until it is time for the indicator to change, and show said next number at the completion of a century, or at any other point of numeral division.

4. The disk $x$, carrying the index-hand C, in combination with the key V, inserted through the opening in the cover-plate.

5. The combination of a primary and a secondary register or indicator in the same apparatus, the secondary indicator registering any part of the total of a series of amounts, and being capable of being set to zero at pleasure, while the primary indicator remains unchanged by such setting of the secondary register to zero, and will continue to register and indicate the total, substantially as and for the purpose described.

6. The means, substantially as shown and described, for attaching an instrument to and releasing the same from the place where used, said means being the inclined hook or horn and the parts bearing upon the same, and a confining wedge or lock.

7. A duplex registering-machine, in which two registers indicate at the same time every registering actuation given, by means of the actuating lever or handle to one of them.

8. An unadjustable register acting simultaneously with another register combined therewith, the said other register being adjustable by means of a knob or key, by which it may be set to any desired indications, substantially as explained.

9. Two registers or indicators in the same apparatus, so arranged and co-operating that one of them serves to check any attempt to make fraudulent indications on the other, substantially as described, for the purpose set forth.

Dated and signed in the city of New York, this 17th day of August, 1876.

HAMILTON E. TOWLE.
JOHN B. BENTON.

Witnesses:
W. M. ALLAIRE,
WM. B. HICKS.